Patented Sept. 23, 1952

2,611,708

UNITED STATES PATENT OFFICE 2,611,708

METHOD OF COATING FOODS WITH PECTINATE OR PECTATE FILMS

Harry S. Owens, Berkeley, and Thomas H. Schultz, Lafayette, Calif., assignors to the United States of America as represented by the Secretary of Agriculture No Drawing. Application July 18, 1950, Serial No. 174,564

14 Claims. (Cl. 99—166)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This application is a continuation-in-part of our copending patent application Serial No. 788,078, filed November 25, 1947, Patent No. 2,517,595.

This invention relates to and has as its prime object the coating of foods with low-methoxyl pectinate or pectate films. In particular, our films are composed of calcium-alkali low-methoxyl pectinates or calcium-alkali pectates and in some cases calcium low-methoxyl pectinates or calcium pectates. Our films are thus composed of derivatives of low-methoxyl pectinic acids or pectic acid chemically combined with calcium and usually also with an alkali cation, that is, an alkali metal or ammonium.

As well known in the art, pectin or pectin source materials may be subjected to de-methoxylation by enzymic, acid, or alkaline processes. In cases where the de-methoxylation is essentially complete the product is pectic acid whereas if the de-methoxylation is partial, and the product has an ester methoxyl content of about 1 to about 7%, it is a low-methoxyl pectinic acid. Although one can use any one of the low-methoxyl pectinic acids containing from about 1% to about 7% methoxyl in our process, we prefer to use those pectinic acids containing about 3% to about 7% methoxyl. In the case of low-methoxyl pectinic acids produced by enzymic de-methoxylation, we prefer to use those having a methoxyl content about from 3.0 to 7% whereas in the case of pectinic acids produced by acid or alkaline de-methoxylation, we prefer to use those having a methoxyl content about from 3.0 to 4%.

The expression "calcium-alkali low-methoxyl pectinate" used herein means a salt of a low-methoxyl pectinic acid with calcium and an alkali metal or ammonium, the salt being either a normal salt or an acid salt. Thus the expression includes calcium-sodium low-methoxyl pectinates, calcium-ammonium low-methoxyl pectinates, calcium sodium-potassium low-methoxyl pectinates, calcium-sodium-hydrogen low-methoxyl pectinates, and so forth. The expression "calcium-alkali pectate" has the same meaning relative to pectic acid.

In the food-packaging art the encasement of foods in films or casings is well known. Natural casings made from animal intestines are widely used. These casings suffer from the disadvantage that they are tough and often difficult to remove from the food product itself. Artificial casings made from regenerated cellulose are also widely employed. These casings are tough and inedible.

It has now been found that the pectinate or pectate films as herein described are eminently suitable for encasing food products. The films according to this invention, particularly the calcium-alkali pectinate or calcium-alkali pectate films, are tender and edible and can be eaten right with the food itself. They are odorless and either tasteless or have a slightly salty taste and thus do not detract from the aroma and taste of the food itself. In the case of a food article coated with a calcium-alkali pectinate film wherein the calcium content is relatively low, if the food article is to be cooked before eating, as by boiling in water, then the film will dissolve in the cooking water and thus be entirely removed.

The pectinate or pectate film according to this invention provides an edible, glossy, smooth, dirt-resisting coating which also serves to hold the food material together and prevents disintegration during storage, shipping, and so forth. It also offers resistance to the action of bacteria and so forth. The film is also useful to encase normally sticky foods such as dried figs, raisins, candied fruit, etc. The material so encased is no longer sticky and the individual units of foods remain separate even after packaging. Since the film is tender and edible, these food products can be eaten directly and there is no necessity for removing the pectinate or pectate film.

In our prior Patent No. 2,517,595 we have disclosed and claimed a one-dip method of forming the above described films, the process involving essentially dipping the food unit into a dispersion of a calcium-alkali pectinate. The instant invention relates to a two-dip method in which the food unit is first dipped into a solution of an alkali pectinate or pectate and the food unit is then dipped into a solution of a calcium salt whereby a coating of the calcium-alkali pectinate or pectate, or in some cases the calcium pectinate or pectate, is formed about the food unit. The so-coated food unit is then dried to produce the finished product. Our two-dip method has several advantages over the one-dip method. For example, the instant process can be carried out at room temperature whereas the one-dip method requires that the calcium-containing pectinate dispersion be retained at an elevated temperature to prevent gelation thereof. Another point is that the two respective dipping solutions used in the instant process can be maintained for long periods of time without harm to the reagents whereas the calcium-pectinate dispersion of the prior invention must be kept warm to be in condition for coating and this elevated temperature tends to cause degradation of the pectous material on standing. Another point is that the use of a two-dip procedure permits one to use large concentrations of flavoring agents. Thus in accordance with this invention the calcium bath may contain a high concentration (10–15%) of salt to produce salt-flavored films as advantageous with nuts, for example. Use of this large concentration of salt does not cause any difficulties, whereas with the prior one-dip process, addition of such high concentration of salt could cause precipitation of a gel from the calcium-alkali pectinate dispersion and would make impossible the formation of satisfactory film coatings.

In accordance with this invention the food unit is first coated with an aqueous solution of an alkali low-methoxyl pectinate or pectate, that is a solution containing a normal or acid salt of an alkali metal or ammonium with a low-methoxyl pectinic acid or pectic acid. This solution is usually applied to the food unit by dipping but it can also be applied by spraying or other conventional coating procedure. The concentration of pectinate or pectate in the coating liquid is not critical. In general the higher concentrations are generally more viscous; hence, form thicker films. A suitable range of concentration is from about 1% to about 5%, usually about 2–3.5%. The pH of the pectinate or pectate solution generally should be within the range of about 4.0 to 6.0. At this pH range, the pectinate or pectate is stable and no degradation will occur if the solution is allowed to stand. Further, at this pH the solution has a viscosity suitable for forming the pectinate or pectate coatings. Commercial low-methoxyl pectinates or pectates are partially neutralized low-methoxyl pectinic acids or pectic acids and their solutions naturally are of pH within the above stated range. If desired, the pH of the coating solution may be adjusted more precisely within this range by addition, with vigorous agitation, of hydrochloric or citric acid to lower it or sodium hydroxide to raise it.

After having formed a liquid coating of the pectinate or pectate, the food unit, while the coating is still wet, is contacted with a solution of a calcium salt. By this means, a metathesis occurs whereby the alkali ions are at least partly replaced by calcium ions and the alkali pectinate or pectate is converted into a calcium-alkali pectinate, a calcium-alkali pectate, a calcium pectinate, or a calcium pectate. As a result, the liquid coating on the food unit is converted into a gel coating which completely envelopes the food unit. At the same time, the food units are rendered non-coherent because the gel coating is smooth and slippery; hence the gel coated food units exhibit no tendency to cohere to one another. As the calcium salt one can use any non-toxic, soluble, ionizable, calcium salt. Although we prefer to use calcium chloride one may also use calcium acetate, monocalcium phosphate, and so forth. The anion to which the calcium ion is attached is essentially unimportant as the primary desideratum is to provide calcium ions. The concentration of the calcium salt is not critical within wide limits. Usually a concentration from about 1% to about 3% is employed. The calcium solution is generally applied by dipping the pectinate or pectate coated food unit into the calcium solution. If desired, however, the calcium solution can be applied by spraying or other conventional means. In general the degree of replacement of alkali ions by calcium ions depends on the time of contact with the calcium bath. Thus to form a calcium-alkali pectinate or pectate film the time of contact with the calcium solution is limited to not more than about 1 minute, preferably 10 to 30 seconds. If the time of contact is extended, further replacement of alkali ions will occur eventually to give a calcium pectinate or pectate film. Essentially complete replacement of the alkali ions requires a time of contact of from about 2 to about 5 minutes. In general we prefer to limit the time of contact to get only partial replacement of the alkali ions, the point being that the calcium-alkali pectinate or pectate films are tender and especially suited to the coating of foods which are to be eaten raw or without further cooking. If the replacement of alkali ions is virtually complete, the resulting calcium pectinate or pectate films are stronger and are more suited to coating of foods which are to be cooked prior to eating. In such case the film is softened during the cooking operation and can easily be stripped off the food unit. If desired, this type of film can be dissolved by immersing the coated food unit in hot water containing a small amount of a calcium-sequestering agent—a sodium polymetaphosphate, for example.

After the food unit has been contacted with the calcium solution to form the pectinate or pectate gel coating, the unit is then dried in air. Usually it is most convenient to place the coated units on a screen and subject them to a current of air until dry whereby the gel coating is converted into a true, self-sustaining film. Usually the air is applied at a temperature somewhat above room temperature, say about 50°–100° C. to cause rapid drying.

In some cases, it is desirable to have the finished film coating contain a plasticizer whereby to increase the flexibility of the film. In order to do this, it is only necessary to incorporate a plasticizer in the original solution of the alkali pectinate or pectate whereby the plasticizer will be occluded in the film. Suitable plasticizers are, for example, tartaric acid, glycol, glycerine, ethylene glycol monoethyl ether, ethylene glycol monoethyl ether, sucrose, gum arabic, and so forth. In general, the proportion of the plasticizer should not be more than about 40% based on the amount of pectinate or pectate. Generally, when a plasticizer is used, it is preferable to also incorporate the same plasticizer in the calcium solution thus to prevent the plasticizer originally introduced in the first bath from being washed out by the calcium solution.

If desired, additional film-forming ingredients may be incorporated in the alkali pectinate or pectate solution. Suitable blending agents are, for example, methyl cellulose, ethyl cellulose, carboxymethyl cellulose or its akali metal or ammonium salts. These water-soluble, cellulosic, blending agents in some cases increase the adherence of the film to the food unit and also often increase the flexibility of the film. The proportion of added blending ingredient is not critical and we have obtained films desirable for food-packaging purposes from the pectinate or pectate solutions containing up to 33% of the blending agent based on the total amount of polysaccharide (cellulosic material plus pectinate or pectate) in the solution.

Various other materials may be incorporated in the pectinate or pectate solution or they may be incorporated in the calcium solution to give the finished film coating any desired characteristic. For example, one may incorporate dyes or pigments in either solution to form a colored film. For example, a red film may be obtained by incorporating a small amount of F. D. & C. Red #1 in the initial coating solution. Mold inhibiting agents may be added to the pectinate or pectate solution to give the film greater protective value. For example, about 0.1% of ethyl parahydroxybenzoate may be incorporated in the solution to give the film mold-inhibiting properties. Other agents of this type which may be used are, for example, methyl parahydroxybenzoate, sodium parahydroxybenzoate, sodium benzoate, ethyl vanillate, and so forth. Flavoring agents may be added to either solution thus to give the film a distinct odor and/or taste. For example, a small amount of monosodium glutamate, meat extract, or protein hydrolysate may be added to the coating solution or the calcium solution thus to give the film a meat flavor. In the same way any other desired flavoring material as for example salt, fruit essences or extracts, spices, condiments, and so forth may be added as is consistent and desirable with the type of food unit being coated. Antioxidants may be incorporated in the coating solution or calcium solution to give the film anti-oxidant properties thus to assist in preserving the film coated food unit. Suitable antioxidants are, for example, ascorbic acid; butylated hydroxyanisole; gallic acid; N-tetra (carboxymethyl) ethylene diamine and the salts thereof; dilauryl thiodipropionate, chlorogenic acid, catechol monobenzoate, N,N'-di-sec-butyl-p-phenylene diamine; 2-tert-butyl, 4-methoxy phenol; p-isopropoxy diphenylamine; 2,5-ditertiary butyl hydroquinone; 2,5-dibenzyl hydroquinone; 2,5-ditertiary amyl hydroquinone; diphenyl p-phenylene diamine; p-hydroxy diphenylamine; N-sec-butyl p-aminophenol; ethyl hydrocaffeate; ethyl gallate; lauryl gallate; thiodipropionic acid; 6-ethoxy-2,2,4-trimethyl-1,2-dihydroquinoline; 6-phenyl-2,2,4-trimethyl-1,2-dihydroquinoline; 2,2,4-trimethyl - 1,2 - dihydroquinoline; nordihydroguaiaretic acid, p-tert-butyl catechol, ascorbylpalmitate, and so forth. These antioxidants are particularly useful where the food is of an oily nature (nuts, for example) and are hence especially prone to rancidification. Only a small concentration of the antioxidant is required in the coating or calcium solution, i. e., from about 0.5% to about 2%, based on the weight of the pectinate or pectate.

The film can also be used to add vitamins or other nutrients to the food. Thus, for example, our process can be used to increase the nutritive value of polished rice or other grains which are low in vitamin content. To this end, to the coating solution is added B vitamins such as thiamin, niacin, pantothenic acid, etc. The calcium bath may also be fortified with an iron salt such as ferric phosphate to increase the nutrient value of the rice. It is evident that by applying the teachings of this invention, one may incorporate in the pectinate or pectate solution or the calcium solution any type of material to give the finished film coating any desired property from the standpoint of color, preservative action, increasing of nutritive value, and so forth.

In coating foods which have water-repellant surfaces (nuts, for example) it is preferred to add a small proportion of a surface active agent to the pectinate (or pectate) solution so that this solution will wet the surface of the food and thus form an adherent, uniform, liquid film thereon. Many different surface active agents may be used for this purpose such as alkyl ($C_8$–$C_{18}$) sulphates, sodium lauryl sulphate, for example; the mono or dialkyl ($C_6$–$C_{18}$) esters of sulphosuccinic acid, sodium di(2 ethylhexyl) sulphosuccinate, for example; the alkyl ($C_3$–$C_{22}$)-aryl sulphonates, sodium dodecyl benzene sulphonate, for example; soluble soaps, sodium laurate, for example; sulphonated or sulphated amides, such as the sodium salt of N-sulphoethyl stearamide; partial esters of polyhydric alcohols such as glycerol, glycol, polyglycerols, polyglycols, sorbitol, mannitol, pentaerythritol with higher fatty acids, sorbitan monolaurate, for example. In general we prefer to use the latter type of compound (partial esters of polyhydric alcohols) as they decrease surface tension without causing stable foams—this decreases the possibility of forming voids in the finished film. In general only a small concentration of the wetting agent is required, i. e., from about 0.01 to about 0.1%. In any particular case, the proper concentration for any particular agent can easily be determined by adding small proportions thereof to the pectinate bath and noting the amount required so that the pectinate solution will form a complete, even liquid layer about the food to be coated.

Our invention can be used to form the above-described pectinate or pectate film coatings on foods of all varieties. Such treatment is particularly advantageous for coating normally sticky foods such as dates, raisins, figs, dried prunes, dried cherries, dried apricots, dried peaches, and candied fruit such as candied citron peel, citrus peel, melon, pineapple, cherries, pears, and so forth to render the surfaces of these foods non-sticky. Thus the film coated products so produced will consist of individual units of the food which do not cohere and thus can easily be removed from the container by simply spilling the contents out. Such behavior is of course to be contrasted with the normal property of these products of forming a unitary mass in the container which can be separated only by pulling apart the individual food units. The film coating may also be applied for the purpose of protecting the foodstuff from contact with dirt, air, and microorganisms. Other examples of foods to which our invention can be applied are sausages, hams, bacon, smoked fish, smoked fowl or other meats and meat products; cheese; butter; pellets or tablets of dried milk or dried eggs; pellets or tablets of dehydrated soups; flavorings, spices, tea; candies; frozen fruits, vegetables, or meats; eggs; and so forth. A particularly significant aspect of this invention is that the process can be used to produce salted nuts which retain their salt coating despite repeated handling of the nuts. To this end, to the calcium bath is added a large concentration of salt, i. e., about 10 to 15%, whereby the film produced under such circumstances will contain an amount of salt required to properly flavor the nuts. Further, this salt-containing film coating will adhere to the nuts during handling. Such behavior is of course to be contrasted with the essentially temporary character of salt dusted on nuts in which case the salt tends to sift off the nuts thus making some of the nuts in a package saltier than others.

The following examples demonstrate our invention in greater detail. It is understood that these examples are furnished only by way of illustration and not limitation.

Example I

A lot of candied fruit (a mixture containing cubes of candied cherries, citrus peel, citron peel, zucca melon, etc. and adapted for use in making bakery products such as fruit cakes) was washed with water to remove the heavy sugar syrup clinging to the surfaces of the particles. The candied fruit was dipped into an aqueous bath containing 3.0% of sodium pectinate (methoxyl content 3%). The pH of this solution was 4.3. The fruit was removed from this bath, then immersed in an aqueous 2% solution of calcium chloride for about 25 seconds. The fruit, coated with a gel coating of calcium sodium pectinate was removed from the calcium chloride solution, drained and dried on a screen in a current of air at 80° C. The candied fruit particles coated with the glossy, transparent calcium-sodium pectinate film were not sticky and even after packaging and storing the individual particles remained separate and free-flowing. This action is to be contrasted with the character of the original candied fruit in which the particles are sticky and cohere together to form a single mass.

Example II

A mixture of spices, ground pork meat and pork fat (commonly known as pork sausage) was molded into the form of small sausages. The sausages were dipped into an aqueous bath containing 3.5% sodium pectinate (methoxyl content 3%) and 1.4% of glycerol. The pH of this solution was approximately 5.0. The sausage was removed from this bath and immersed for 25 seconds in an aqueous 2% solution of calcium chloride. The sausage was removed from the solution, drained, and dried in a current of air at 50° C. The sausage coated with a transparent, glossy film of calcium sodium pectinate had a very attractive appearance. Since the film is edible, the sausages could be fried directly without any necessity for removing the coating.

Example III

A lot of shelled almonds were dipped in an aqueous bath containing 2% of sodium pectate, 0.8% glycerol, 0.05% brown food dye, and 0.1% of sodium isopropyl naphthalene sulphonate (a wetting agent). The pH of this solution was 5.4. The nuts were removed from this solution, then immersed for 25 seconds in an aqueous bath containing 2% calcium chloride, 10% sodium chloride, and 1% glycerol. The nuts were removed from this bath, drained, and dried in a current of air at 95°–100° C. The nuts coated with a film of calcium-sodium pectate and containing sodium chloride had a very pleasing, glossy appearance and when tasted were found to contain the proper amount of salt.

Example IV

A lot of pitted dates were immersed in an aqueous solution containing 3.5% sodium pectinate (methoxy content 3.1%) and 15% sucrose. The pH of this solution was 4.5. The coated dates were removed from the pectinate solution, then immersed in a 1.5% calcium chloride solution for 10 seconds. The gel coated dates were removed from the calcium solution, washed briefly with water and dried for 20 minutes in air at a temperature of 80° C. The dates encased in the calcium-sodium pectinate film were not sticky in contrast to the original fruit.

Example V

A lot of broken almond nut meats were dipped in an aqueous solution containing 3.5% sodium pectinate (methoxy content 3.5%), 1.4% glycerol, 0.01% sorbitan monolaurate, and 0.25% Ponceau SX (a red dye). The pH of this solution was 4.4. The coated nuts were then immersed for 25 seconds in a bath containing 1.5% aqueous calcium chloride, 12.5% sodium chloride, and 1.5% glycerol, drained, then dried in a current of air at about 95° C. The glossy, orange-red film-coated nuts had a much more attractive appearance than the original stock.

Example VI

A lot of diced, candied citron peel was washed briefly with water, then dipped into an aqueous solution containing 2.3% sodium pectinate (methoxyl content 4.5%) and 0.94% sodium pectate. The viscosity of this solution was 206 c. p. and the pH was 4.5. The peel was removed from the coating solution and immersed for 25 seconds in 2.8% aqueous calcium chloride solution. The gel coated products were then dried in air at 50° C. The candied fruit coated with a film of calcium-sodium pectinate and pectate was glossy in appearance and the individual particles were not sticky.

Example VII

Broken almond nut meats were dipped in an aqueous solution containing 3.0% of sodium pectinate (methoxyl content=2.9%), 1.2% glycerol, 0.05% brown food dye, 0.01% sorbitan monolaurate, 0.015% sodium N (tetra-carboxymethyl) ethylenediamine, and 0.015% butylated hydroxyanisole. The pH of this solution was 4.5. After two seconds of draining, the pieces were dropped into an aqueous solution containing 2.5% calcium chloride, 12.5% sodium chloride and 2.0% glycerol where they remained with gentle agitation for 15 seconds. Then they were drained and dried at 95° C. The coated nut pieces were attractive and of good flavor.

Example VIII

A mixture of spices, ground pork and ground beef was molded into the form of frankfurters.

(a) One lot of the frankfurters was dipped into an aqueous bath containing 3.5% sodium pectinate (methoxyl content 3%), this bath having a pH of 5.0.

(b) Another lot of the frankfurters was dipped into an aqueous bath containing 3.5% of sodium pectate, this bath having a pH of 5.0.

Both lots of frankfurters were removed from the coating baths and separately immersed for 4 minutes each in a 2% calcium chloride solution, then dried in a current of air at 50° C. Thus the products of lot (a) were coated with a film of calcium pectinate, whereas the products of lot (b) were coated with a film of calcium pectate.

Both lots of frankfurters were then given a dry heat processing treatment to cook the meat and render it directly edible. After this treatment, the products were immersed in hot water containing 0.5% sodium polymetaphosphate to dissolve the films thus to produce "skinless" frankfurters.

Having thus described our invention, we claim:

1. The process of encasing foods with an edible film envelope which comprises coating the food with a solution containing a member of the group consisting of alkali low-methoxyl pectinates and alkali pectates, contacting the coated food with a solution containing calcium ions to gel the coating, then drying the gel coating to form said film.

2. The process of encasing foods with an edible film envelope which comprises coating the food with a solution containing an alkali low-methoxyl pectinate, contacting the coated food with a solution containing calcium ions to gel the coating, then drying the gel coating to form said film.

3. The process of encasing foods with an edible film envelope which comprises coating the food with a solution containing an alkali pectate, contacting the coated food with a solution containing calcium ions to gel the coating, then drying the gel coating to form said film.

4. The process of encasing foods with an edible film envelope which comprises coating the food with a solution containing a water-soluble cellulosic substance and a member of the group consisting of alkali low-methoxyl pectinates and alkali pectates, contacting the coated food with a solution containing calcium ions to gel the coating, then drying the gel coating to form said film.

5. The process of encasing foods with an edible film envelope which comprises coating the food with a solution containing a water-soluble cellulosic substance and an alkali low-methoxyl pectinate, contacting the coated food with a solution containing calcium ions to gel the coating, then drying the gel coating to form said film.

6. The process in accordance with claim 5 wherein the cellulosic substance is methyl cellulose.

7. The process in accordance with claim 5 wherein the cellulosic substance is ethyl cellulose.

8. The process in accordance with claim 5 wherein the cellulosic substance is carboxymethyl cellulose.

9. The process of encasing foods with an edible film envelope which comprises coating the food with a solution containing a water-soluble, cellulosic substance and an alkali pectate, contacting the coated food with a solution containing calcium ions to gel the coating then drying the gel coating to form said film.

10. The process in accordance with claim 9 wherein the cellulosic substance is methyl cellulose.

11. The process in accordance with claim 9 wherein the cellulosic substance is carboxymethyl cellulose.

12. The process of encasing nuts with an edible film envelope which comprises coating the nuts with a solution containing a member of the group consisting of alkali low-methoxyl pectinates and alkali pectates, contacting the coated nuts with a solution containing calcium ions to gel the coating and about 10 to 15% salt, then drying the gel coating to form said film.

13. The process of encasing foods with an edible film envelope which comprises coating the food with a solution containing a member of the group consisting of alkali low-methoxyl pectinates and alkali pectates, contacting the coated food with a solution containing calcium ions to gel the coating, then drying the gel coating to form said film, at least one of said solutions containing an anti-oxidant.

14. The process of encasing foods with an edible film envelope which comprises coating the food with a solution containing a surface-active agent and a member of the group consisting of alkali low-methoxyl pectinates and alkali pectates, contacting the coated food with a solution containing calcium ions to gel said coating, then drying the gel coating to form said film.

HARRY S. OWENS.
THOMAS H. SCHULTZ.

REFERENCES CITED

The following references are of record in the file of this patent:

UNITED STATES PATENTS

| Number | Name | Date |
| --- | --- | --- |
| 1,510,679 | Katzprowsky | Oct. 7, 1924 |
| 2,245,576 | Dickinson et al. | June 17, 1941 |
| 2,480,103 | Fux | Aug. 30, 1949 |
| 2,517,595 | Owens et al. | Aug. 8, 1950 |

OTHER REFERENCES

Baker: "Food Industries," January 1941, page 56.